March 14, 1961 D. LEVIN 2,974,823
PRESSURE STEAM COOKERS
Filed Feb. 24, 1958
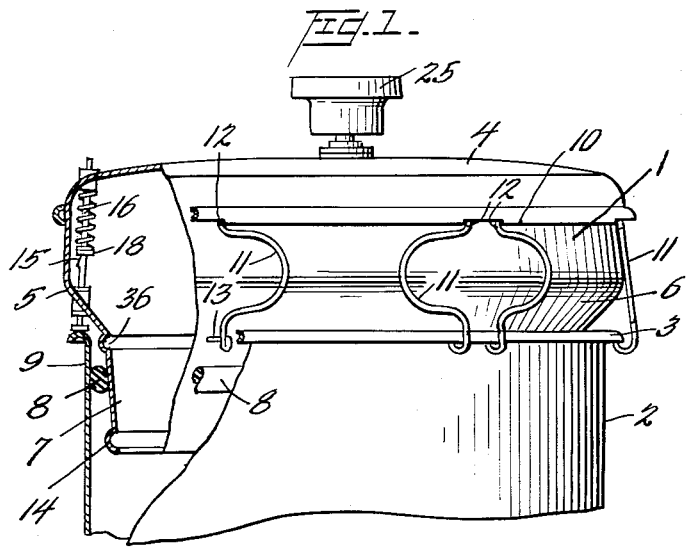
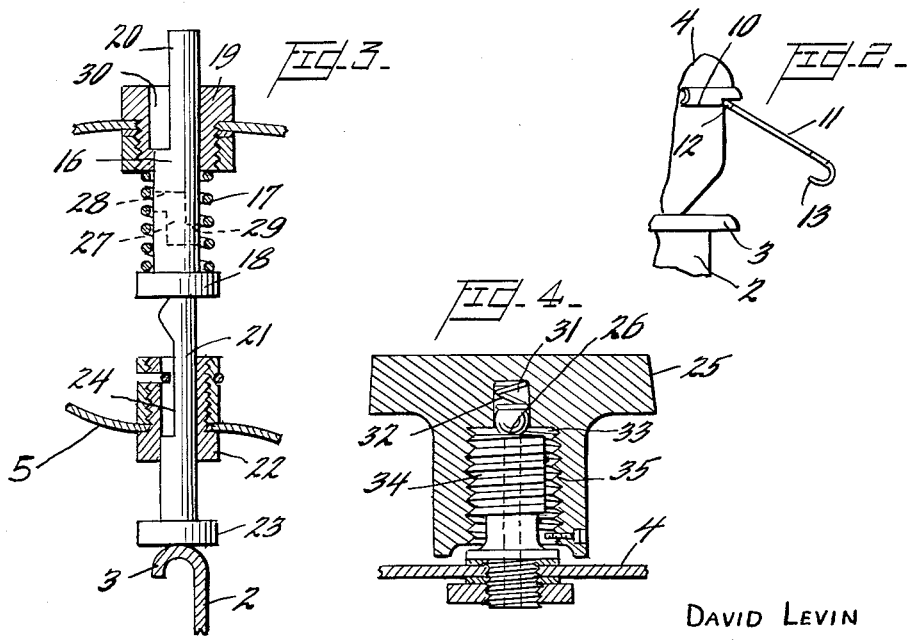
DAVID LEVIN
INVENTOR
BY Watson, Cole, Grindle + Watson
ATTORNEY

United States Patent Office 2,974,823
Patented Mar. 14, 1961

2,974,823
PRESSURE STEAM COOKERS

David Levin, 308 Lucerne Mansions, De Villiers St., Johannesburg, Union of South Africa Filed Feb. 24, 1958, Ser. No. 717,154

Claims priority, application Union of South Africa Mar. 1, 1957

4 Claims. (Cl. 220—44)

This invention relates to pressure steam cookers and more particularly to apparatus adapted for attachment to cooking pots of standard shape to form a pressure cooker.

In accordance with this invention there is provided a cover for a cooking pot comprising a top with a downwardly extending skirt the lower portion of which is adapted to fit inside the upper part of the pot, a ring of jointing material to fit between said lower portion of the skirt and the inside wall of the pot, hasps suspended from the upper portion of the cover to engage the top of the pot and a pressure relief valve.

Further features of the invention provide for the pot to be cylindrical and for a projection at its top to be the normally outwardly bent rim.

The invention further provides for the hasps to be extensible to allow the cover to rise under steam pressure and for one or more valves adapted to open automatically to allow the escape of steam lifting the cover.

The invention also provides for the hasps to be made of spring steel wire bent normally to stand out away from the pot when not under tension, and for a pressure relief valve to be embodied in a central knob for the cover.

A preferred form of the invention is shown in the accompanying drawing.

Fig. 1 shows the cover partly in section and mounted on a cooking pot.

Fig. 2 shows a hasp released.

Fig. 3 is an enlarged detail of a double acting automatic relief valve, and

Fig. 4 is an enlarged detail of the knob for the cover adapted to act as an automatic as well as a hand operated relief valve.

In the drawings is shown a cover 1 for a circular straight sided cooking pot 2. Cover 1 is made of sheet metal and the cooking pot 2 is conveniently of standard size in enamelware having an outwardly projecting top edge 3 forming a circumferential rim.

The cover 1 may have a low domed top 4 with part 5 extending over the edge 3 of the pot. Below the part 5 and inwardly thereof is formed a skirt 6 terminating in the drawing in the shape of a truncated inverted cone 7. The lower part of the cone 7 is made to fit easily within the top edge 3 of the pot 2 while the upper part of the cone 7 will be a closer fit therein. A torus ring of rubber 8, circular in cross section, encircles the cone 7 and fits against the wall 9 of the pot 2 when the cover 1 is first inserted but will roll up the cone 7 as the cover 1 is pressed down to form a tight joint between the cover 1 and the wall 9 of the pot 2.

Hinged to the edge 10 of the dome 4 of the cover 1 are a number of bent wire hasps 11. The wire is bent to a generally oval shape with its free ends 12, at one end of the minor axis of the oval, reversed and bent to clip into a slot in the rolled edge 10 of the top part 4 of the cover 1. The wire 11 at the opposite end of the minor axis is bent to form a catch 13 to engage the rim 3 of the pot 2 when the cover 1 is in place. The ends 12 of the wire 11 with the rolled edge 10 together form the hinge for the hasp 11 but the parts of the hinge are mutually shaped to cause the hasps 11 normally to spring outwardly away from the top edge 10 of the pot when said hasps 11 are not in tension. The beaded edge 14 at the bottom of the cone 7 prevents the ring 8 from rolling off said cone.

Under steam pressure the hasps 11 extend in shape and will allow the cover 1 to rise in the pot 2 to a limited extent and such movement is made to open a relief valve or valves to release excessive pressure of the steam in the pot before the cover 1 is lifted too high. One such form of valve 15 is shown in the drawings.

In the one preferred form of valve 15, illustrated in Fig. 3, there is provided a piston 16 having a head 18 loaded to be opened automatically by a light coil spring 17. The valve port is in the form of a ring-like sleeve 19 bored to fit the piston 16. The top of the piston 16 has a slot 20 so that when the spring 17 pushes down the piston 16 the slot 20 passes through the sleeve 19 and the steam can escape. The piston valve 16 is pressed up to close the slot 20 in the sleeve 19 when the cover 1 is pushed down into the pot 2. In this position a sliding pin 21 fitting a guide 22 projecting from part 5 has its head 23 in contact with the flange on the top edge 3 of the pot 2 while its other end contacts head 18 of valve 15.

The pin 21 may also act as a valve for the escape of steam. When pin 21 is pushed well into the guide 22 there is no escape of steam but when the cover 1 rises in the pot 2 due to the pressure of the steam in the pot the pin 21 is pressed down by the head 18 and a long cut or port 24 in the surface of the pin 21 will allow the steam to escape to atmosphere through the guide 22. In this way the valve 15 allows the steam to escape through the two ports 20 and 24.

The knob 25 for lifting the cover 1 is furnished with a relief valve 26 which is opened when knob 25 is turned. This usually is required to relieve a vacuum or low pressure in the cooking pot 2 but it may be made to act as an automatic high pressure relief valve as hereinafter described.

As a further safety precaution the bottom end of the piston valve 16 may be made hollow as shown by the dotted lines 27 and two holes 28, 29 made in the side of valve 16. The spring 17 need only be a light one and should the steam pressure be very excessive, the pressure on the cross sectional area of piston 16 would be sufficient to lift it and allow steam to escape through the holes 28, 29 and slot 30.

As an additional safety precaution the ball valve 26 in knob 25 may be made free to move up in recess 31 but is normally kept in place by a spring 32, the pressure of which could easily be made adjustable but is preferably fixed at a given strength to avoid maladjustment but which would allow any excessive steam pressure to escape through a passage 33 from the top of the valve seat across the top of the screw threaded centre 34 and down the side passage 35 to the bottom of knob 25.

As an example of the use of this invention it will be assumed that the cooking of some food in water and steam under pressure is to be carried out and in a suitable standard enamelware cooking pot 2. With the food ready in the pot 2, a cover 1 according to this invention is placed on top of the pot 2. The cover 1 is pressed down so that a rolling sealing joint is made by the ring 8 of circular jointing material between the cone 7 and the inside 9 of the pot 2. A good joint is easily effected due to the conical surface 7 of skirt 6.

As the cover 1 is pressed down the wire hasps 11 are manually pressed in towards the pot 2 so that the catch 13 on the lower part of the hasps 11 will engage the rim extending from the top edge 3 of the pot 2. The top edge 3 of the pot 2 will press the pin 21 of the valve 15 upwardly. This will result in the head 18 moving up to compress the spring 17. The piston 16 of valve 15 will slide a limited distance in the ring-like sleeve 19 and the valve is closed. With the cover 1 in position and the pressure relief valve 15 closed heat is applied to the pot 3.

The steam pressure generated will tend to lift the cover 1 and under tension the extensible wire hasps 11 will be stretched and will allow the cover 1 to rise relative to the pot 2. Should this rise be excessive, as the cover 1 lifts, the spring 17 will press down the pin 21 allowing piston valve 16 to move down. When the movement has gone a predetermined distance it will result in the steam escaping through the ports 20 and 24.

As there are a number of hasps 11 regularly spaced round the rolled edge 10 of cover 1 and each one acting independently, the amount of steam pressure used at any particular time may be regulated by the number of hasps 11 actually brought into use. The hasps 11 not in use are simply left projecting outwardly or they may be removed.

With the cooking completed and the pot 2 allowed to cool the partial vacuum created in the pot 2 due to the condensation of the steam will draw the cover 1 further into the pot 2 and, if the cover 1 is drawn in sufficiently, the hasps 11 will become automatically disengaged and spring outwardly. The knob 25 on the cover may then be turned which will lift valve 26 (see Fig. 4) when the cover 1 may readily be removed. If the hasps 11 have not become automatically released, manual pressure on the cover is all that is required to release them.

To avoid the ring 8 being accidentally rolled out of position, a bead 36 may be formed on the skirt 6 to limit its upward movement.

Usually with domestic steam pressure cooking a number of articles of food are placed in the steam cooker all to be cooked at the same time. This invention provides that with a number of covers of suitable sizes and a range of cooking pots of standard sizes, different foods may be cooked by steam pressure, cooking each in a separate pot.

What I claim as new and desire to secure by Letters Patent is:

1. A cover for a cylindrical cooking pot having an outwardly projecting rim, said cover comprising a top, a truncated inverted conical skirt projecting downwardly from said top and shaped to fit within the pot, an annular resilient seal on said skirt, extensible hasps attached to said top and shaped detachably to engage the rim of the pot, and a pressure relief valve in said cover comprising a ring-like sleeve, a slotted spring loaded piston valve slidably mounted in said sleeve, a guide in said cover and a pin slidable therein, said pin being positioned to engage said rim and to make contact with said spring loaded piston valve whereby said valve is opened to relieve the pressure in said pot when the pressure causes said hasps to extend.

2. A cover for a cylindrical pot as claimed in claim 1 in which said pin has a longitudinal slot extending for a distance longer than its guide.

3. A cover for a cylindrical pot as claimed in claim 1 in which said spring loaded piston valve has an axial hole in the lower part of its length and radial outwardly opening ports at each end of the hole.

4. A cover for a cylindrical cooking pot having an outwardly projecting rim, said cover comprising a top, a truncated inverted conical skirt projecting downwardly from said top and shaped to fit within the pot, a resilient seal in the form of a torus ring fitting between the skirt and pot, annular beads pressed outwardly at the top and bottom of the truncated conical portion of the skirt, extensible hasps attached to said top and shaped detachably to engage the rim of the pot, and a pressure relief valve in said cover and positioned to co-operate with said rim whereby movement of said rim away from said cover causes said valve to open.

References Cited in the file of this patent

UNITED STATES PATENTS

| | | |
|---|---|---|
| 463,228 | Halliburton et al. | Nov. 17, 1891 |
| 893,483 | Gray | July 14, 1908 |
| 1,502,673 | Hole | July 29, 1924 |
| 1,641,681 | Kircher | Sept. 6, 1927 |
| 2,534,164 | Finch | Dec. 12, 1950 |

FOREIGN PATENTS

| | | |
|---|---|---|
| 265,121 | Great Britain | May 19, 1927 |
| 281,092 | Switzerland | May 16, 1952 |
| 464,534 | Great Britain | Apr. 20, 1937 |
| 572,839 | Great Britain | Oct. 25, 1945 |